(12) United States Patent
Hosono et al.

(10) Patent No.: US 8,731,473 B2
(45) Date of Patent: May 20, 2014

(54) SHORT RANGE WIRELESS COMMUNICATION APPARATUS

(75) Inventors: Sachiyo Hosono, Kariya (JP); Ryuuji Sakata, Kariya (JP)

(73) Assignee: Denso Corporation, Kariya (JP)

(*) Notice: Subject to any disclaimer, the term of this patent is extended or adjusted under 35 U.S.C. 154(b) by 177 days.

(21) Appl. No.: 13/534,386

(22) Filed: Jun. 27, 2012

(65) Prior Publication Data
US 2013/0005260 A1    Jan. 3, 2013

(30) Foreign Application Priority Data

Jun. 30, 2011   (JP) ................................. 2011-145786

(51) Int. Cl.
*H04B 7/00* (2006.01)

(52) U.S. Cl.
USPC ...................................... 455/41.2; 455/569.2

(58) Field of Classification Search
USPC ................ 455/41.2, 569.1, 569.2, 41.3, 512
See application file for complete search history.

(56) References Cited

U.S. PATENT DOCUMENTS

| | | | | |
|---|---|---|---|---|
| 6,687,517 B2* | 2/2004 | Kinnunen | ................... | 455/569.1 |
| 7,050,834 B2* | 5/2006 | Harwood et al. | ............. | 455/563 |
| 7,162,276 B2* | 1/2007 | Iwase | ......................... | 455/569.1 |
| 8,150,474 B2* | 4/2012 | Saito et al. | ................. | 455/569.2 |
| 8,620,217 B2* | 12/2013 | Saito et al. | ................... | 455/41.2 |
| 2006/0079182 A1 | 4/2006 | Matsuda | | |
| 2007/0129116 A1* | 6/2007 | Katoh et al. | ............... | 455/569.1 |
| 2008/0269961 A1 | 10/2008 | Shitanaka et al. | | |
| 2009/0253466 A1 | 10/2009 | Saito et al. | | |
| 2009/0253467 A1 | 10/2009 | Saito | | |
| 2010/0070637 A1* | 3/2010 | Saito et al. | ..................... | 709/228 |
| 2012/0309315 A1* | 12/2012 | Sakata et al. | ................. | 455/41.2 |
| 2012/0329396 A1* | 12/2012 | Matsushita | .................. | 455/41.2 |
| 2013/0005262 A1* | 1/2013 | Sakata | .......................... | 455/41.2 |
| 2013/0005263 A1* | 1/2013 | Sakata | .......................... | 455/41.2 |

FOREIGN PATENT DOCUMENTS

| | | |
|---|---|---|
| JP | 2006-148864 | 6/2006 |
| JP | 2008-273370 | 11/2008 |
| JP | 2009-253601 | 10/2009 |
| JP | 2009-253602 | 10/2009 |
| JP | 2009-253603 | 10/2009 |

OTHER PUBLICATIONS

"MCPC TR-004 VCer1.0 Bluetooth Multi-Profile Technical Reference" issued Jan. 28, 2005; Mobile Computing Promotion Consortium (MCPC) (http://www.mcpc-jp.org/news/pdf/TR-004).

* cited by examiner

*Primary Examiner* — Sonny Trinh
(74) *Attorney, Agent, or Firm* — Harness, Dickey & Pierce, PLC

(57) ABSTRACT

Multiple profiles are concurrently connected between an in-vehicle apparatus and a mobile phone. A streaming function is performed based on a related profile of the multiple profiles. A dial-up networking profile connection request occurs but is rejected to make connection unsuccessful. In such a case, the in-vehicle apparatus disconnects the related profile out of the currently connected multiple profiles or interrupts the streaming function based on the related profile. The in-vehicle apparatus then performs a re-connection of the dial-up networking profile with the mobile phone because the cause of rejecting the dial-up networking profile connection request is removed.

20 Claims, 10 Drawing Sheets

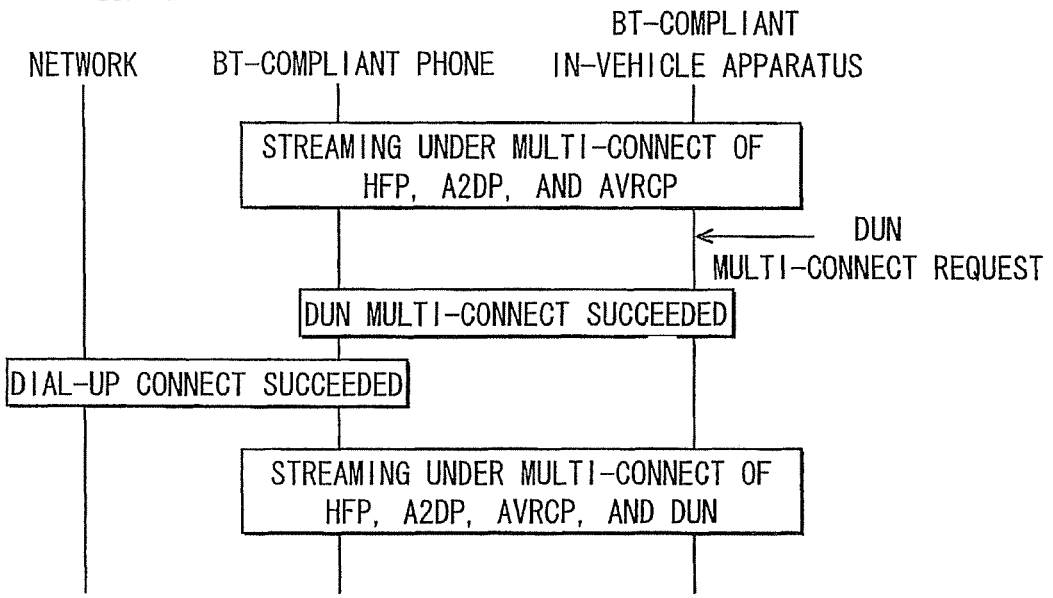
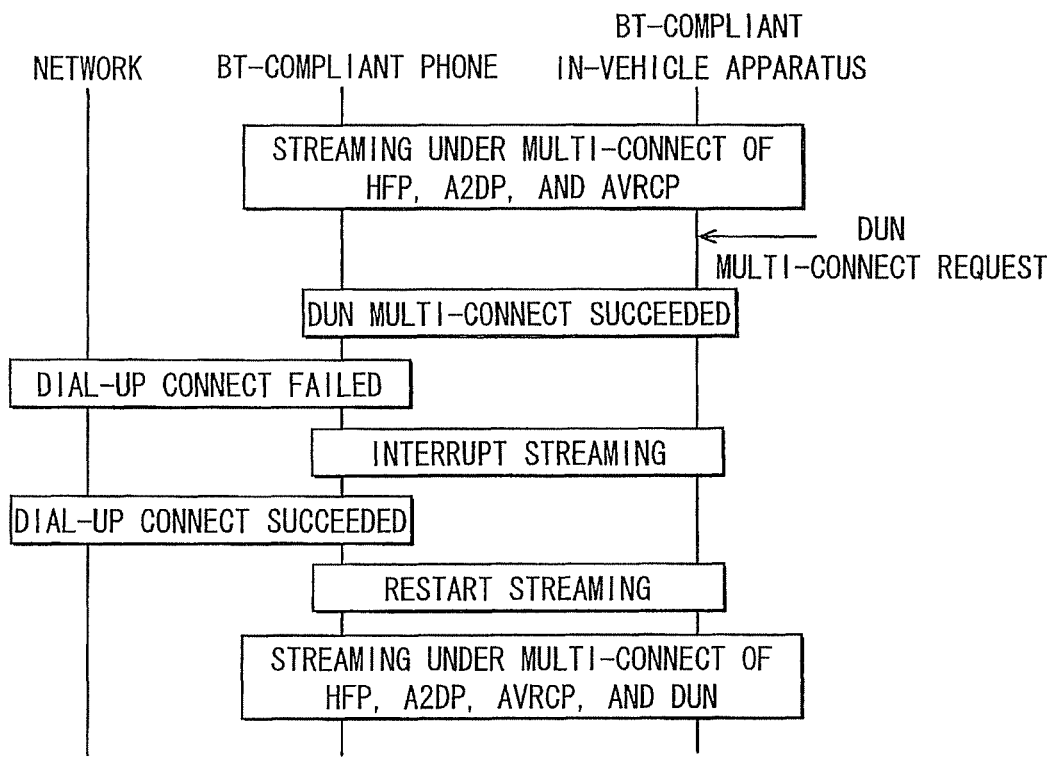

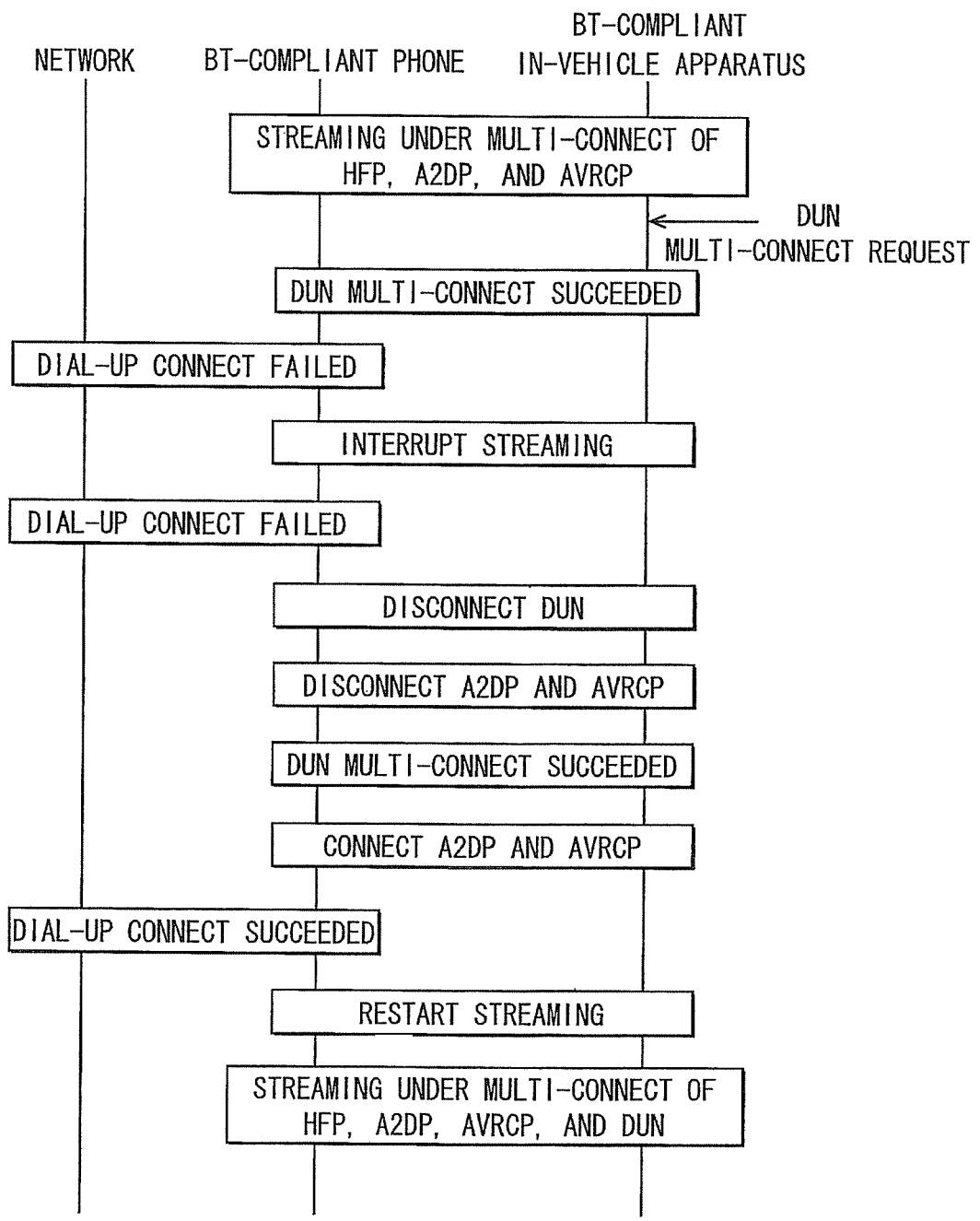

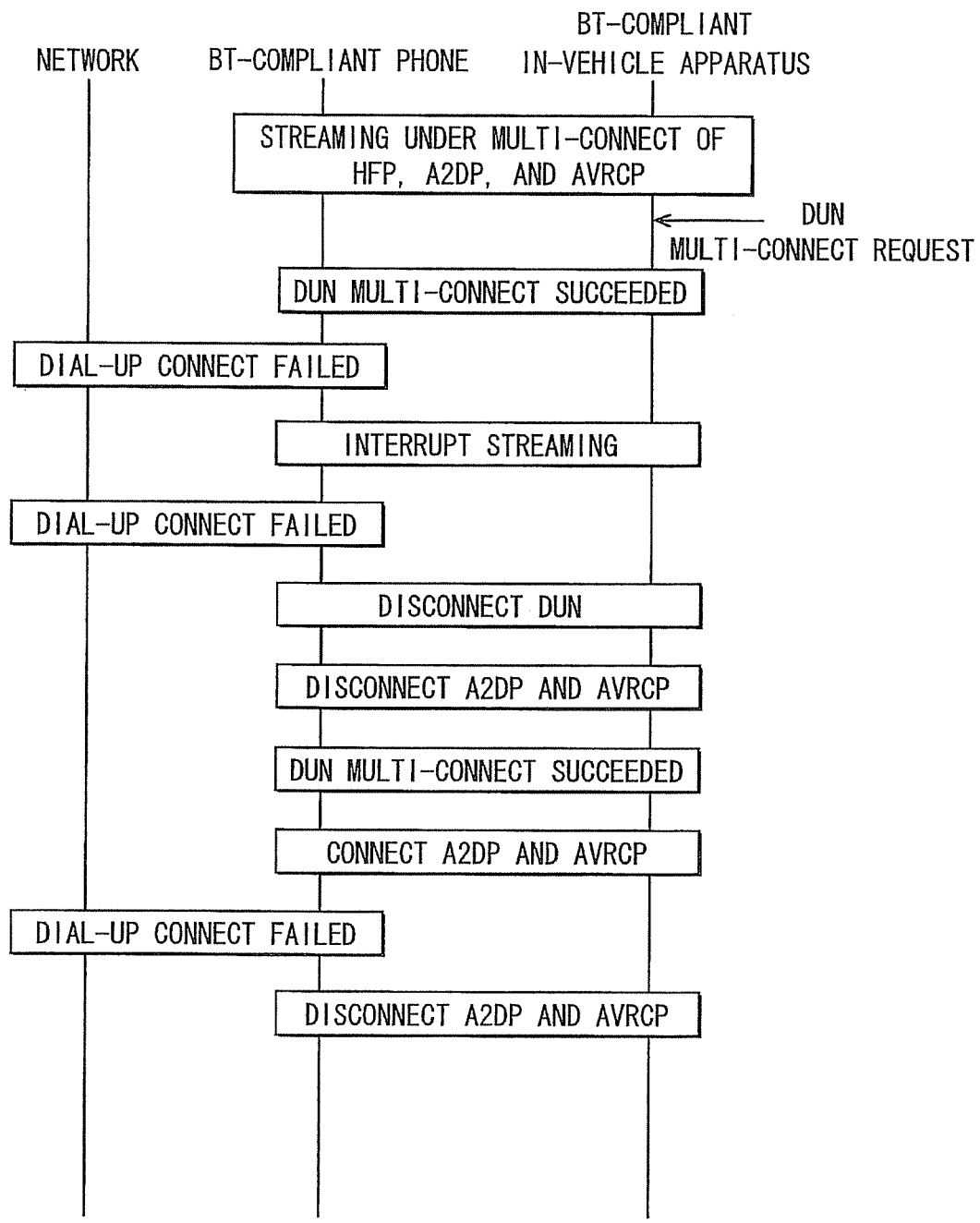

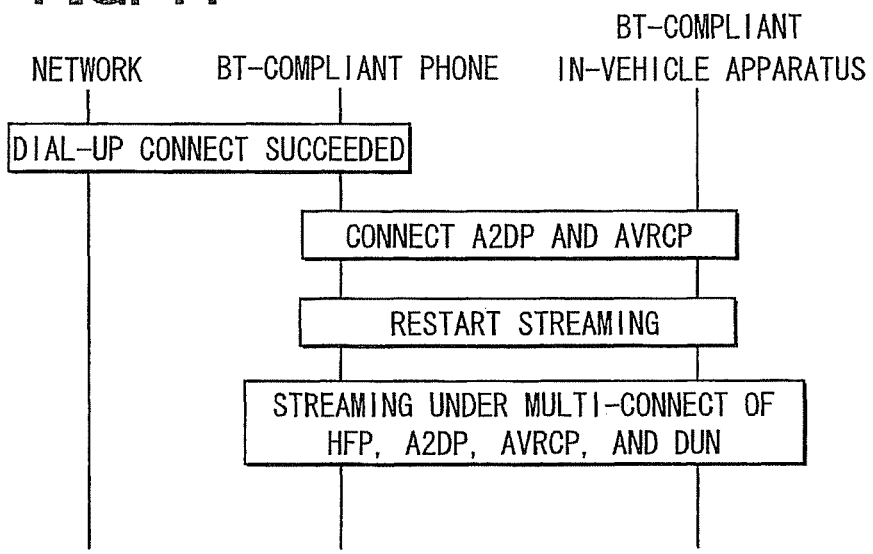
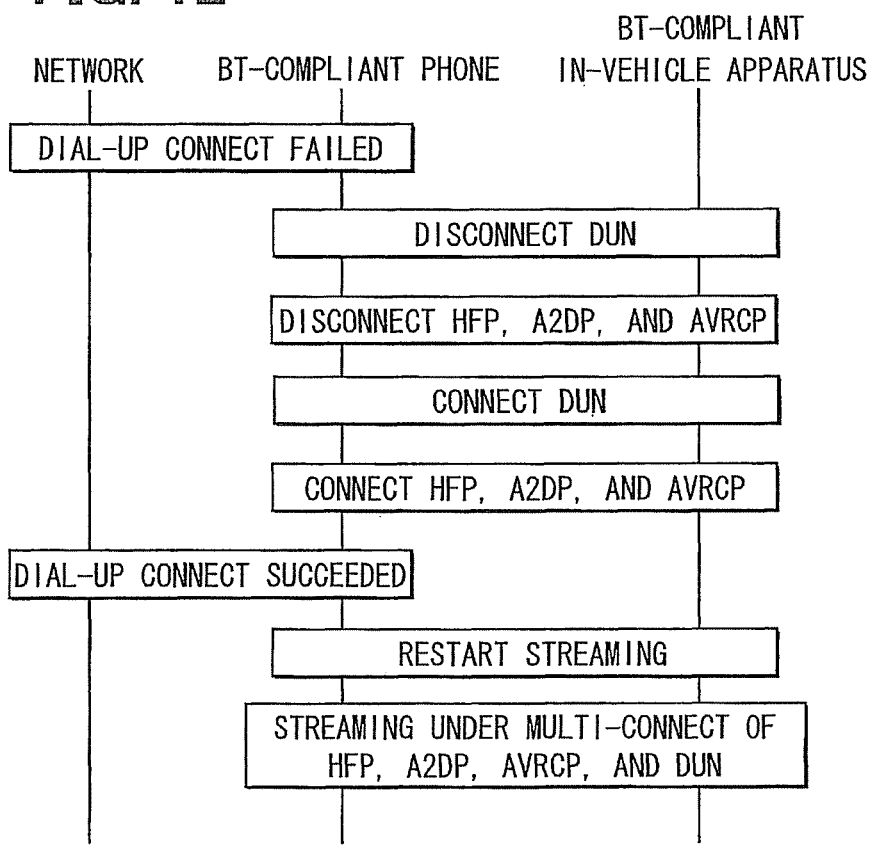

SHORT RANGE WIRELESS COMMUNICATION APPARATUS

CROSS REFERENCE TO RELATED APPLICATION

This application is based on Japanese Patent Application No. 2011-145786 filed on Jun. 30, 2011, the disclosure of which is incorporated herein by reference.

TECHNICAL FIELD

The present disclosure relates to a short range wireless communication apparatus including a connection device capable of concurrently connecting multiple communication protocols with a communication-party connection device via a short range wireless communication link.

BACKGROUND

[Patent document 1] JP 2008-273370 A (US 2008/0269961)
[Patent document 2] JP 2009-253601 A (US 2009/0253466)
[Patent document 3] JP 2009-253603 A (US 2009/0253466)

A short range wireless communication module is mounted on a short range wireless communication apparatus including a short range wireless communication function. The short range wireless communication module can concurrently connect multiple communication protocols (multi-connection) with a short range wireless communication module of a communication-party apparatus (e.g., see Patent documents 1 through 3).

While multiple communication protocols are connected concurrently, the short range wireless communication apparatus may issue a connection request for another communication protocol in order to enable additional connection. In such a case, the connection request may be rejected depending on specifications of the communication-party apparatus. The communication-party apparatus rejects the connection request for another communication protocol from the short range wireless communication apparatus chiefly because of the specification of the communication-party apparatus.

SUMMARY

The present disclosure has been made in consideration of the foregoing. It is therefore an object of the present disclosure to provide a short range wireless communication apparatus capable of connecting another communication protocol with a communication-party apparatus when a request to connect such another communication protocol occurs while multiple communication protocols are concurrently connected to the communication-party apparatus.

To achieve the above object, according to a first example of the present disclosure, a short range wireless communication apparatus is provided to include a connection device and a control device. The connection device is capable of concurrently connecting a plurality of communication protocols with a communication-party connection device through a short range wireless communication link. The control device controls connection and disconnection of each of the plurality of communication protocols. Herein, when a connection request for an other communication protocol occurs under a state where multiple communication protocols of the plurality of communication protocols are concurrently connected between the connection device and the communication-party connection device, the control device performs a connection of the other communication protocol between the connection device and the communication-party connection device. The other communication protocol is included in the plurality of communication protocols but different from the multiple communication protocols. Further, when it is determined that the connection of the other communication protocol between the connection device and the communication-party connection device resulted in a failure, the control device selects as a disconnection target at least one of the multiple communication protocols being concurrently connected, performs a disconnection of the disconnection target, and performs a re-connection of the other communication protocol, the connection of which resulted in the failure, between the connection device and the communication-party connection device.

Under a state where multiple communication protocols are concurrently connected to the communication-party apparatus, a connection request for another communication protocol occurs. However, the connection request may be rejected to cause the connection of the other communication protocol to be unsuccessful. Under the above configuration of the first example, the short range wireless communication apparatus selects at least one of concurrently connected communication protocols as a disconnection target and disconnects the same. The short range wireless communication apparatus disconnects the selected communication protocol, thereby removing a cause of rejecting the connection request for the other communication protocol. The short range wireless communication apparatus can then perform re-connection of the other communication protocol, the connection of which was unsuccessful, with the communication-party apparatus.

Further, according to a second example of the present disclosure, a short range wireless communication apparatus is provided to include a connection device and a control device. The connection device is capable of concurrently connecting a plurality of communication protocols with a communication-party connection device through a short range wireless communication link. The control device controls connection and disconnection of each of the plurality of communication protocols. Herein, when a connection request for an other communication protocol occurs under a state where multiple communication protocols of the plurality of communication protocols are concurrently connected between the connection device and the communication-party connection device, the control device performs a connection of the other communication protocol between the connection device and the communication-party connection device. The other communication protocol is included in the plurality of communication protocols but different from the multiple communication protocols. Further, when it is determined that a connection to an outside communication network resulted in a failure, the connection to the outside communication network accompanying the connection of the other communication protocol between the connection device and the communication-party connection device, the control device selects as a disconnection target at least one of the multiple communication protocols being concurrently connected, performs a disconnection of the disconnection target, and performs a re-connection of the other communication protocol between the connection device and the communication-party connection device.

Under a state where multiple communication protocols are concurrently connected to the communication-party apparatus, a connection request for another communication protocol occurs and a connection to an outside communication network accompanies the connection of the other communication protocol. However, the connection to the outside communication network may result in a failure. Under the above configuration of the second example, the short range wireless communication apparatus selects at least one of concurrently connected communication protocols as a disconnection target and disconnects the same. The short range wireless communication apparatus disconnects the selected communication protocol, thereby removing a cause of rejecting the connection to the outside communication network. The short range wireless communication apparatus can then perform re-connection of the other communication protocol, the connection of which did not provide a success in the connection to the outside communication network, with the communication-party apparatus.

Further, according to a third example of the present disclosure, a short range wireless communication apparatus is provided to include a connection device and a control device. The connection device is capable of concurrently connecting a plurality of communication protocols with a communication-party connection device through a short range wireless communication link. The control device controls interrupt and re-connection of a data communication using each of the plurality of communication protocols. Herein, when a connection request for an other communication protocol occurs under a state where multiple data communications using multiple communication protocols of the plurality of communication protocols are performed between the connection device and the communication-party connection device, the control device performs a connection of the other communication protocol between the connection device and the communication-party connection device. The other communication protocol is included in the plurality of communication protocols but different from the multiple communication protocols. Further, when it is determined that the connection of the other communication protocol between the connection device and the communication-party connection device resulted in a failure, the control device selects as an interrupt target at least one of the multiple data communications being performed between the connection device and the communication-party connection device, performs an interrupt of the interrupt target, and performs a re-connection of the other communication protocol, the connection of which resulted in the failure, between the connection device and the communication-party connection device.

Under a state where multiple data communications using multiple communication protocols are performed with the communication-party apparatus, a connection request for another communication protocol occurs. However, the connection request may be rejected to cause the connection of the other communication protocol to be unsuccessful. Under the above configuration of the third example, the short range wireless communication apparatus selects at least one of the data communications as a disconnection target and disconnects the same. The short range wireless communication apparatus disconnects the selected data communication, thereby removing a cause of rejecting the connection request for the other communication protocol. The short range wireless communication apparatus can then perform re-connection of the other communication protocol, the connection of which was unsuccessful, with the communication-party apparatus.

Further, according to a fourth example of the present disclosure, a short range wireless communication apparatus is provided to include a connection device and a control device. The connection device is capable of concurrently connecting a plurality of communication protocols with a communication-party connection device through a short range wireless communication link. The control device controls connection and disconnection of each of the plurality of communication protocols. Herein, when a connection request for an other communication protocol occurs under a state where multiple communication protocols of the plurality of communication protocols are concurrently connected between the connection device and the communication-party connection device, the other communication protocol being included in the plurality of communication protocols but different from the multiple communication protocols, the control device selects as a disconnection target at least one of the multiple communication protocols being concurrently connected, performs a disconnection of the disconnection target, and performs thereafter a connection of the other communication protocol between the connection device and the communication-party connection device.

Under a state where multiple communication protocols are concurrently connected to the communication-party apparatus, a connection request for another communication protocol occurs. Under the above configuration of the fourth example, the short range wireless communication apparatus then selects at least one of concurrently connected communication protocols as a disconnection target and disconnects the same. The short range wireless communication apparatus disconnects the selected communication protocol, thereby removing a cause of rejecting the connection request for the other communication protocol. The short range wireless communication apparatus can then perform the connection of the other communication protocol with the communication-party apparatus.

BRIEF DESCRIPTION OF THE DRAWINGS

The above and other objects, features, and advantages of the present disclosure will become more apparent from the following detailed description made with reference to the accompanying drawings. In the drawings:

FIGS. 7, 8, 9, 10, 11, 12, and 13 are sequence diagrams.

DETAILED DESCRIPTION

Figure 1:
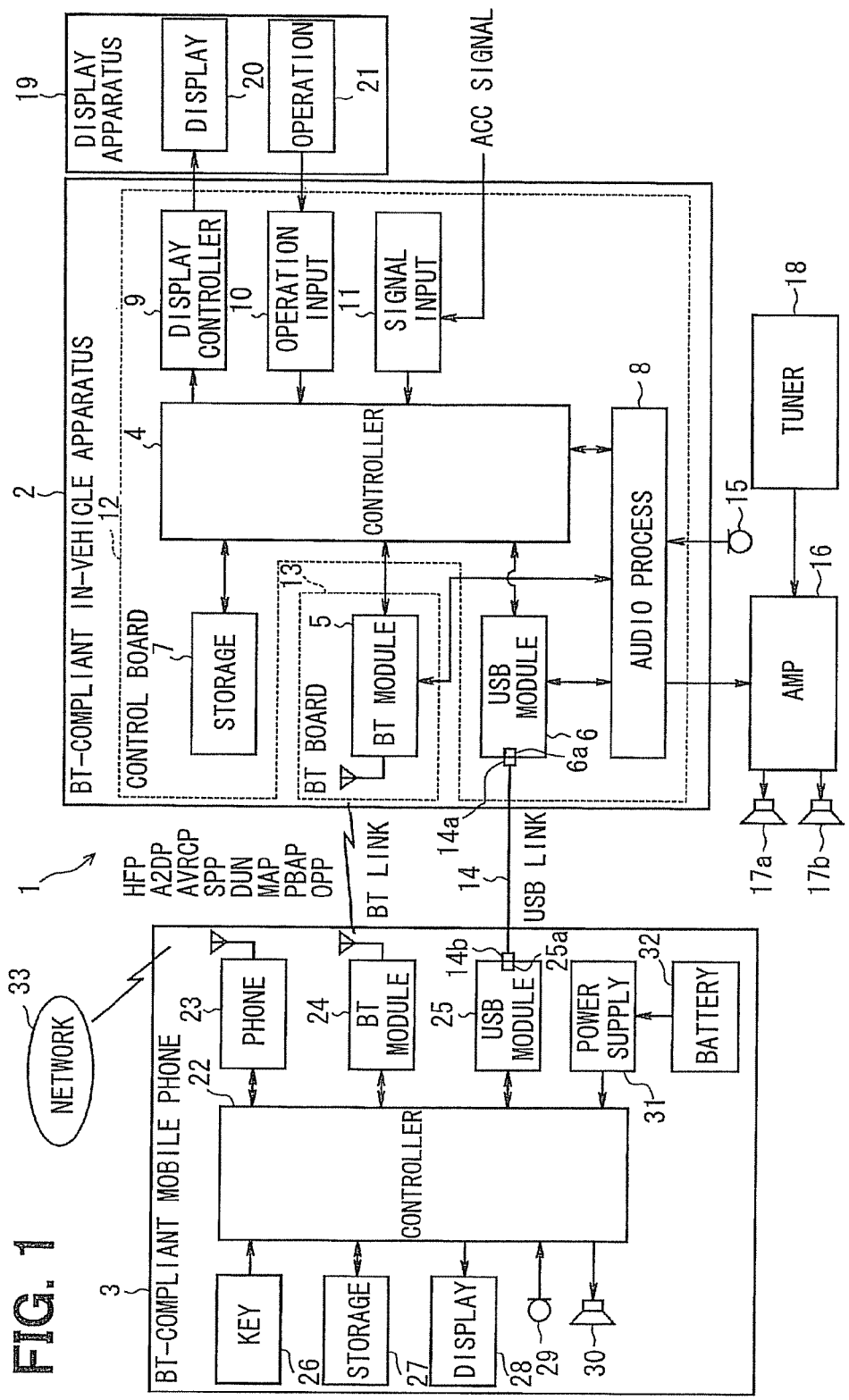
FIG. 1 is a functional block diagram showing an embodiment of the present disclosure.

With reference to the accompanying drawings, the following describes an embodiment of the present disclosure applied to a Bluetooth-compliant in-vehicle apparatus (hereinafter simply referred to as an in-vehicle apparatus) including a Bluetooth communication function. Bluetooth is a registered trademark and is hereinafter simply referred to as BT. The embodiment assumes the following. The in-vehicle apparatus is mounted in a vehicle compartment. A BT-compliant mobile phone (hereinafter referred to simply as a mobile phone) provided with the BT communication function is carried into the vehicle compartment. The in-vehicle apparatus is capable of BT communication with the mobile phone.

A BT communication system 1 includes an in-vehicle apparatus 2 and a mobile phone 3. The in-vehicle apparatus 2 is mounted on a vehicle and is equivalent to the short range wireless communication apparatus. The mobile phone 3 is carried into a vehicle compartment. The in-vehicle apparatus 2 includes a controller 4 (equivalent to a control device or means), a BT module 5 (equivalent to a connection device or means), a USB (Universal Serial Bus) module 6, a storage portion 7, an audio processing portion 8, a display controller 9, an operation input portion 10, and a signal input portion 11. The controller 4, the USB module 6, the storage portion 7, the audio processing portion 8, the display controller 9, the operation input portion 10, and the signal input portion 11 are mounted on a control board 12. The BT module 5 is mounted on a BT module board 13 that is provided as a member different from the control board 12. The controller 4 and the BT module 5 are connected to each other through a USB.

The controller 4 is provided as a known computer including a CPU, RAM, ROM, and an I/O bus. The controller 4 controls overall operations such as communication operations and data management operations for the in-vehicle apparatus 2. Functionally, the BT module 5 connects a BT communication link (equivalent to a short range wireless communication link) with a BT module of the mobile phone 3 (to be described). In addition, the BT module 5 performs BT communication through a BT communication link. The BT module 5 can concurrently connect all or multiple profiles (multi-connection) within a plurality of profiles specified in the BT communication standard. The plurality of profiles are as follows. HFP (Hands Free Profile) specifies hands-free conversation. A2DP (Advanced Audio Distribution Profile) specifies audio data transfer. AVRCP (Audio/Video Remote Control Profile) specifies transfer of control data concerning audio data control. SPP (Serial Port Profile) specifies data communication available for virtual serial ports. DUN (Dial-up Networking Profile) specifies dial-up connection to the Internet (Communication Network to be described later). MAP (Message Access Profile) specifies e-mail data transfer. PBAP (Phone Book Access Profile) specifies phone book data transfer. OPP (Object Push Profile) also specifies phone book data transfer. The profiles HFP, A2DP, AVRCP, SPP, DUN, MAP, PBAP, and OPP are equivalent to communication protocols defined for the corresponding functions.

The USB module 6 has a connection terminal 6a attachable to and detachable from a connection terminal 14a of a USB connection cable 14. Suppose that one connection terminal 14a of the USB connection cable 14 is connected to the connection terminal 6a and the other connection terminal 14b of the USB connection cable 14 as a USB link is connected to a USB module connection terminal of the mobile phone 3 (to be described). In this state, the USB module 6 connects the USB communication link with the USB module of the mobile phone 3 and enables USB communication using the USB communication link.

The storage portion 7 includes a storage area to store various data. The storage portion 7 stores e-mail data transferred from the mobile phone 3 to the BT module 5 that connects MAP with the BT module of the mobile phone 3. The e-mail data includes the following information: the sender of the e-mail; the date and time when the mobile phone 3 received the e-mail; the type of e-mail; and the e-mail subject entered by the sender. The storage portion 7 stores phone book data, call origination data, and call termination data when the BT module 5 connects PBAP with the BT module of the mobile phone 3. The phone book data is transferred from the mobile phone 3 to the BT module 5. The call origination data shows correspondence between the call origination time and the call origination phone number associated with a call origination operation from the in-vehicle apparatus 2 or a call origination operation from the mobile phone 3 that connects HFP with the in-vehicle apparatus 2. The call termination data shows correspondence between the call termination time and the call termination phone number associated with a call termination operation at the mobile phone 3 that connects HFP with the in-vehicle apparatus 2. Herein, the "origination" may be also referred to an "outgoing"; the "termination" may be referred to as an "incoming."

The audio processing portion 8 connects with a microphone 15 that is provided in the vehicle compartment and is positioned near a steering unit where the voice uttered from a user can be easily collected, for example. The audio processing portion 8 also connects with an audio amplifier 16 provided outside the in-vehicle apparatus 2. The audio amplifier 16 connects with speakers 17a and 17b.

Suppose that HFP is connected between the BT module 5 and the BT module of the mobile phone 3 (to be described). In this state, when the microphone 15 inputs the voice uttered from the user as transmission voice data, the audio processing portion 8 processes the input transmission voice data and outputs the processed data to the BT module 5. When the BT module 5 inputs reception voice data, the audio processing portion 8 outputs the input reception voice data to the audio amplifier 16.

The A2DP and AVRCP connections may be established between the BT module 5 and the BT module of the mobile phone 3 (to be described). In this case, the A2DP and AVRCP connections enables a transfer of audio data from the BT module of the mobile phone 3 to the BT module 5. The audio processing portion 8 outputs the transferred audio data to the audio amplifier 16. The USB communication may be available between the USB module 6 and the USB module of the mobile phone 3 (to be described). In this case, the USB communication link enables a transfer of audio data from the USB module of the mobile phone 3 to the USB module 6. The audio processing portion 8 outputs the transferred audio data to the audio amplifier 16.

The audio amplifier 16 is supplied with the reception voice data or audio data from the audio processing portion 8. The audio amplifier 16 then amplifies the supplied reception voice data or audio data and outputs it from the speakers 17a and 17b. The audio amplifier 16 also connects with a tuner deck 18. The tuner deck 18 supplies the audio amplifier 16 with music data reproduced from a music recording medium, for example. The audio amplifier 16 also amplifies the supplied music data and outputs it from the speakers 17a and 17b.

A display apparatus 19 includes a display unit 20 and an operation unit 21. The display unit 20 displays various display windows in a screen. The operation unit 21 forms a touch switch on the display window or screen. When supplied with a display instruction signal from the controller 4, the display controller 9 controls display operations of the display unit 20 in the display apparatus 19 based on the supplied display instruction signal. The operation input portion 10 is supplied with an operation detection signal from the operation unit 21 when a user operates a touch switch formed on the display window or screen. The operation input portion 10 outputs the supplied operation detection signal to the controller 4. The controller 4 analyzes the operation detection signal supplied from the operation input portion 10 and specifies the user operation.

The signal input portion 11 is connected to an ACC (accessory) switch mounted on the vehicle. The signal input portion 11 is supplied with an ACC signal supplied from the ACC switch and outputs the supplied ACC signal to the controller 4. The controller 4 turns on or off an apparatus power supply based on the ACC signal supplied from the signal input portion 11. That is, the controller 4 turns on the apparatus power supply (to start the in-vehicle apparatus 2) when the ACC signal transitions from the off-state to the on-state. The controller 4 turns off the apparatus power supply (to stop the in-vehicle apparatus 2) when the ACC signal transitions from the on-state to the off-state.

The mobile phone 3 includes a controller 22, a phone communication portion 23, a BT module 24 (equivalent to a communication-party connection device or means), a USB module 25, a key input portion 26, a storage portion 27, a display portion 28, a microphone 29, a speaker 30, and a power supply portion 31.

The controller 22 includes a CPU, RAM, ROM, and an I/O bus used for a known microcomputer. The controller 22 controls overall operations such as communication operations and data management operations for the mobile phone 3. The phone communication portion 23 performs phone communication with a phone communication network 33. The phone communication network 33 includes the Internet as described above and facilities such as a mobile phone base station and a base station control apparatus that provide known mobile phone communication services. The BT module 24 connects a BT communication link with the BT module 5 of the in-vehicle apparatus 2 and performs BT communication through the BT communication link. The BT module 24 can concurrently connect multiple profiles such as HFP, A2DP, AVRCP, SPP, DUN, MAP, PBAP, and OPP, which are included in the profiles specified in the BT communication standard as explained above.

The USB module 25 includes a connection terminal 25a attachable to and detachable from the connection terminal 14b of the USB connection cable 14. Suppose that one connection terminal 14a of the USB connection cable 14 is connected to the connection terminal 6a of the USB module 6 of the in-vehicle apparatus 2 and the other connection terminal 14b of the USB connection cable 14 is connected to the connection terminal 25a. In this state, the USB module 25 connects the USB communication link with the USB module 6 of the in-vehicle apparatus 2 and performs USB communication using the USB communication link.

The key input portion 26 includes various keys the user can operate. When the user operates a key, the key input portion 26 outputs the corresponding operation detection signal to the controller 22. The controller 22 analyzes the operation detection signal supplied from the key input portion 26 and identifies the user operation. The storage portion 27 includes a storage area to store various data. The display portion 28 is supplied with a display instruction signal from the controller 22 and displays various display windows based on the supplied display instruction signal. The microphone 29 supplies the controller 22 with the voice uttered from a user as transmission voice data. The controller 22 processes the supplied transmission voice data. The phone communication portion 23 supplies the controller 22 with reception voice data. The controller 22 outputs the supplied reception voice data as the voice from the speaker 30. The power supply portion 31 supplies the power discharged from a battery 32 as operating power to respective function blocks. The battery 32 is attachable to and detachable from the mobile phone body.

According to the above-mentioned configuration, the controller 4 can control connection and disconnection of profiles between the BT modules 5 and 24. That is, the controller 4 can connect a profile between the BT modules 5 and 24 by allowing the BT module 5 to transmit a profile connection request signal to the BT module 24. The controller 4 can disconnect a profile between the BT modules 5 and 24 by allowing the BT module 5 to transmit a profile disconnection request signal to the BT module 24.

The controller 4 can control interrupt and restart of data communication performed by a profile connected between the BT modules 5 and 24. That is, the controller 4 can interrupt data communication in progress between the BT modules 5 and 24 by allowing the BT module 5 to transmit a data communication interrupt request signal to the BT module 24. The controller 4 can restart the interrupted data communication by allowing the BT module 5 to transmit a data communication restart request signal to the BT module 24.

The BT modules 5 and 24 may connect DUN with each other. In this case, the controller 4 allows the BT module 5 to transmit a dial-up connection request signal to the BT module 24. In the mobile phone 3, the controller 22 determines that the BT module 24 receives a dial-up connection request signal from the BT module 5. The controller 22 then allows the phone communication portion 23 to make dial-up connection to the communication network 33. The controller 22 then allows the BT module 24 to transmit a dial-up connection completion signal to the BT module 5 under the condition of successful dial-up connection to the communication network 33 from the phone communication portion 23. The controller 4 determines that the BT module 5 receives the dial-up connection completion signal from the BT module 24. The controller 4 then determines successful dial-up connection to the communication network 33 from the phone communication portion 23.

Figure 2:
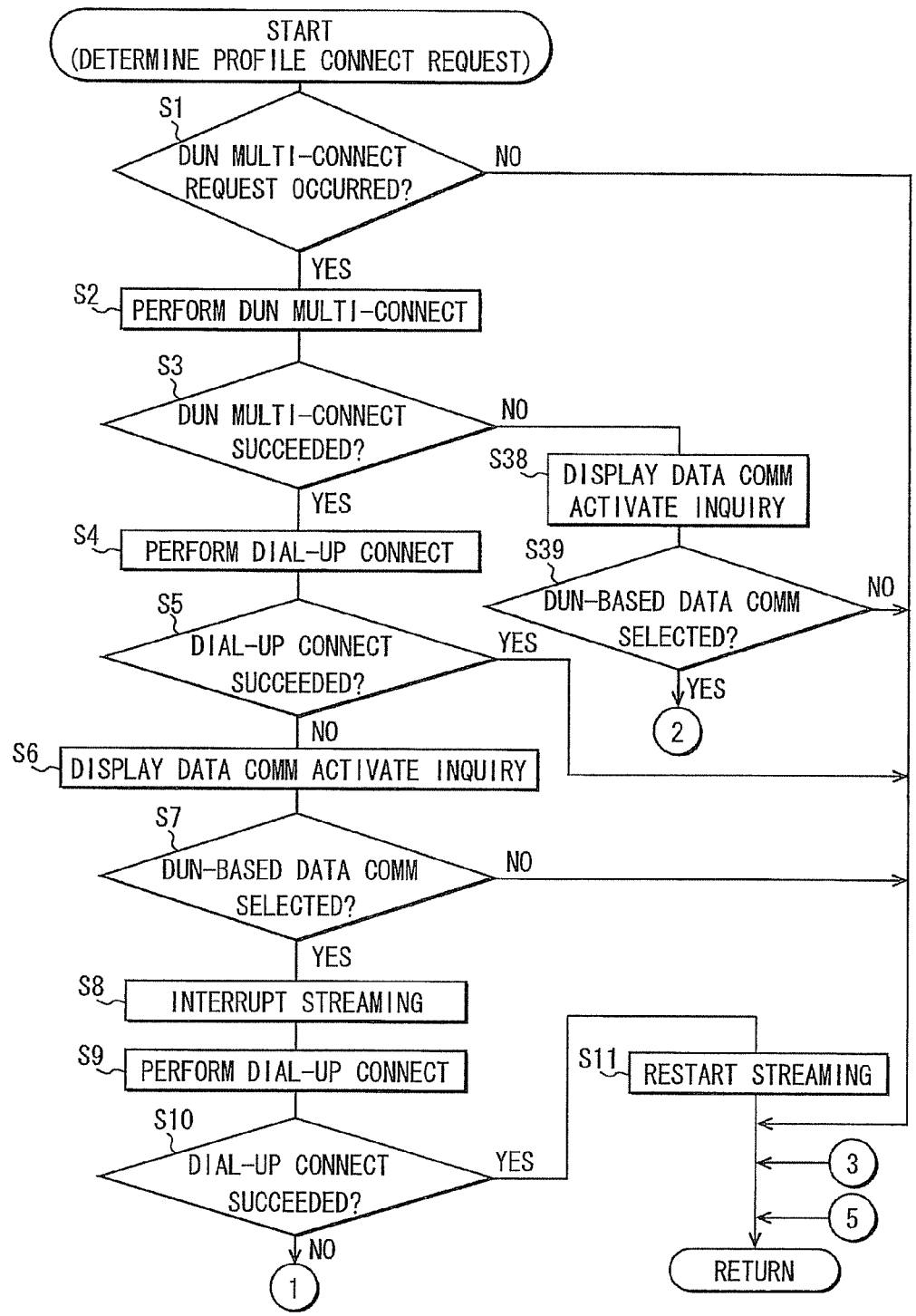
FIGS. 2, 3, and 4 are flowcharts showing processes performed by an in-vehicle apparatus.
Figure 3:
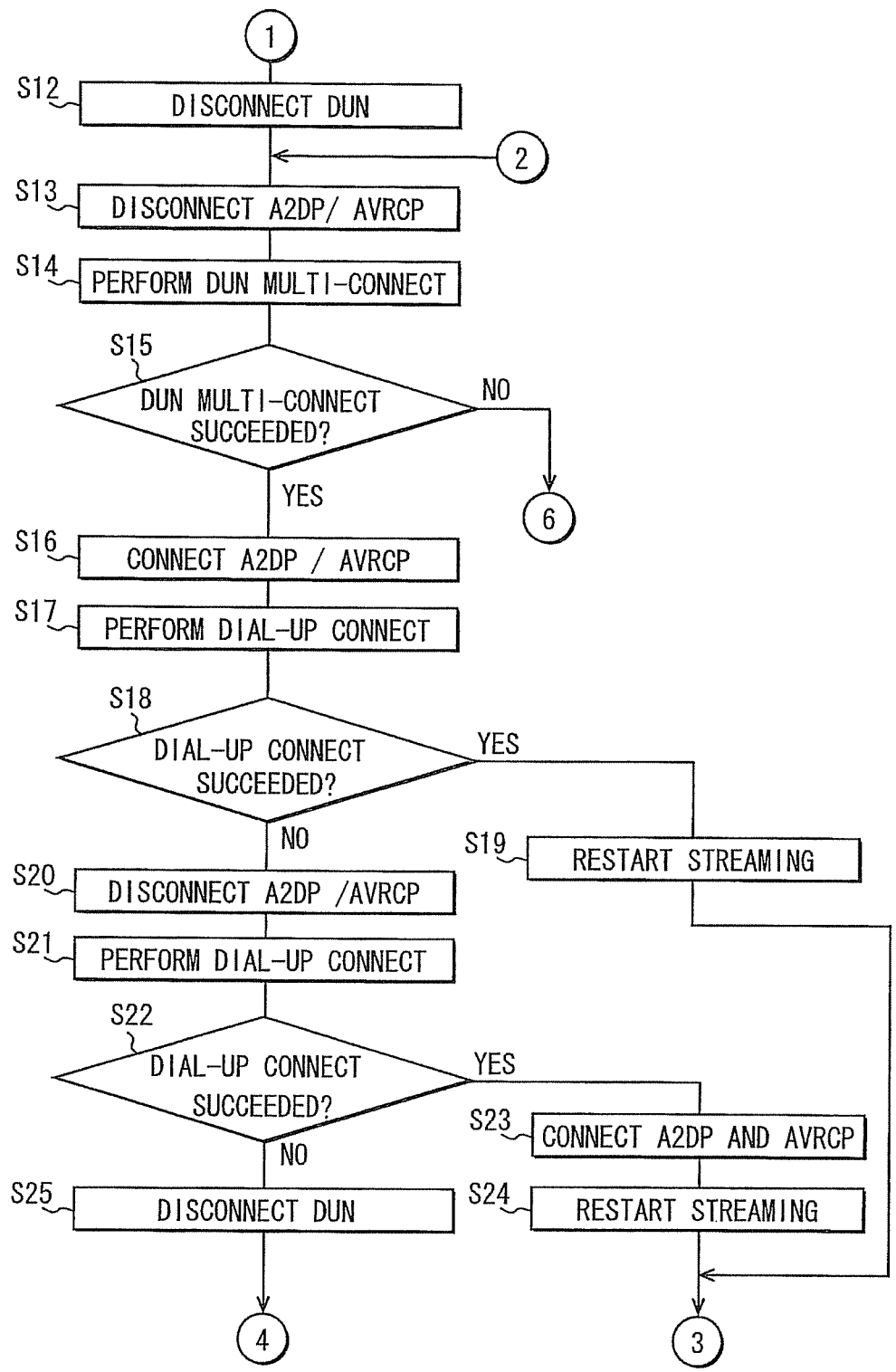
Figure 4:
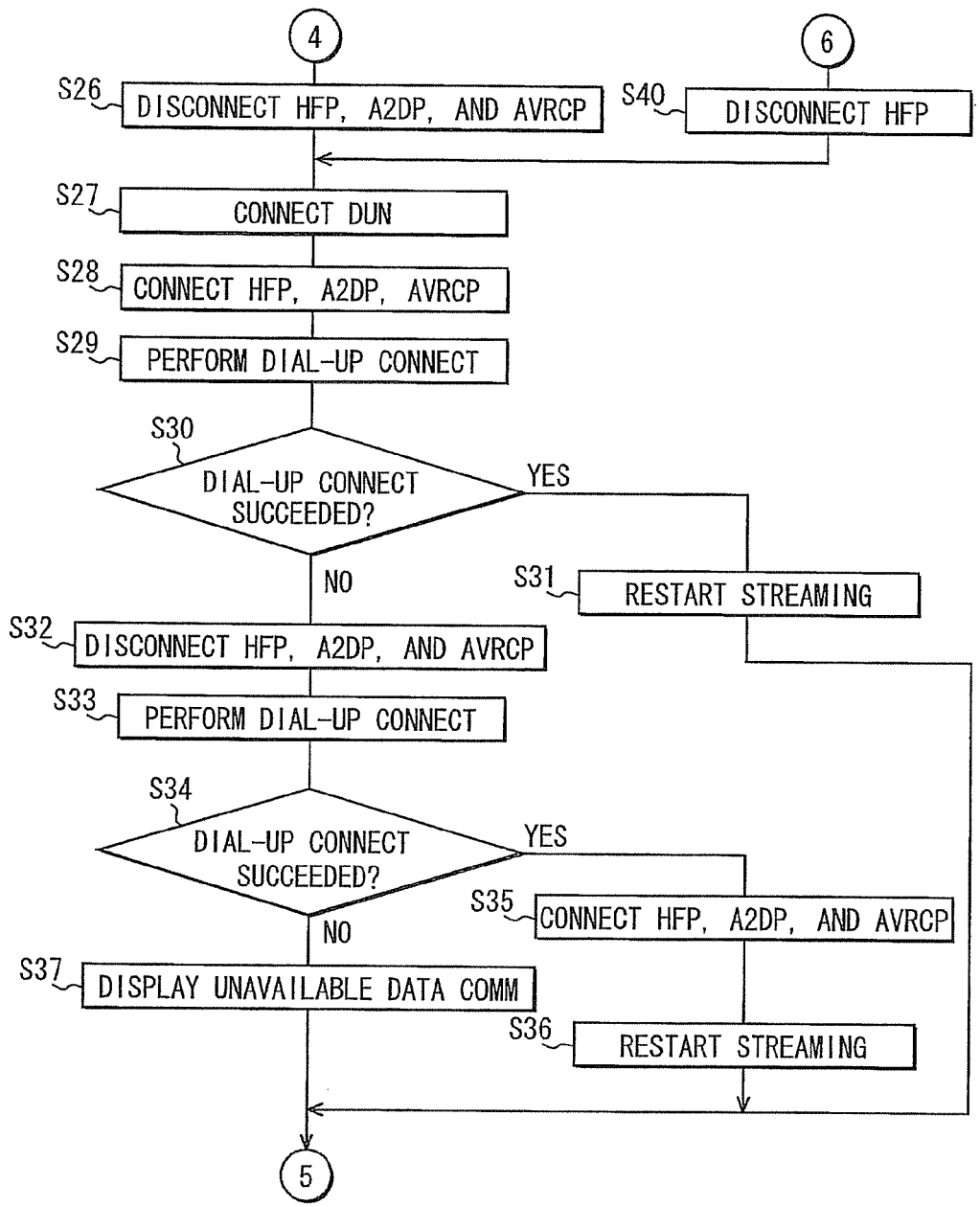

Operations of the above-mentioned configuration will be described with reference to FIGS. 2 through 13. FIGS. 2 through 4 are flowcharts showing processes performed by the controller 4 of the in-vehicle apparatus 2. The description assumes the following. The BT modules 5 and 24 are concurrently connecting HFP, A2DP, and AVRCP. The BT module 24 is performing a streaming function to transfer music data to the BT module 5 based on A2DP and AVRCP. Under this condition, a request for DUN multi-connection (additional connection) occurs. HFP, A2DP, and AVRCP are equivalent to several or multiple communication protocols. DUN is equivalent to another connection-requested communication protocol. As described above, the DUN profile performs dial-up connection to the communication network 33 from the phone communication portion 23. Thus, both of (i) successful DUN multi-connection and (ii) successful dial-up connection to the communication network 33 are necessary for successful connection of another communication protocol. For example, a request for SPP multi-connection may occur instead of a request for DUN multi-connection. Unlike DUN, the SPP profile does not make connection to the communication network 33 from the phone communication portion 23. Thus, only successful SPP multi-connection is necessary for successful connection of another communication protocol.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

In the in-vehicle apparatus 2, the controller 4 performs a main process when the power of the in-vehicle apparatus 2 is turned on (i.e., when the ACC switch is turned on). The controller 4 periodically performs a profile connection request determination process as a sub-process of the main process at a specified cycle.

The controller 4 changes the main process to the profile connection request determination process and starts it. The controller 4 then determines whether a profile connection request occurs (S1). The controller 4 may determine that a DUN multi-connection request occurs as the profile connection request (YES at S1). In this case, the BT modules 5 and 24 are concurrently connecting HFP, A2DP, and AVRCP as described above. The controller 4 performs DUN multi-connection between the BT modules 5 and 24 during concurrent connection of HFP, A2DP, and AVRCP. The controller 4 then determines whether the DUN multi-connection succeeds (S3) (i.e., whether the DUN multi-connection results in a success).

The controller 4 may determine that DUN is connected between BT modules 5 and 24 and the DUN multi-connection succeeds (YES at S3). The controller 4 allows the BT module 5 to transmit the dial-up connection request signal to the BT module 24. The controller 4 allows the phone communication portion 23 to make dial-up connection to the communication network 33 (S4). The controller 4 determines whether the dial-up connection from the phone communication portion 23 to the communication network 33 succeeds (S5) (i.e., whether the dial-up connection from the phone communication portion 23 to the communication network 33 results in a success).

The controller 4 may determine that the BT module 24 receives the dial-up connection completion signal from the BT module 24. That is, the controller 4 may determine that the dial-up connection from the phone communication portion 23 to the communication network 33 succeeds (YES at S5). The controller 4 terminates the profile connection request determination process and returns to the main process.

As shown in FIG. 7, the controller 4 transitions to concurrent connection of HFP, A2DP, AVRCP, and DUN. In this case, an occurrence of the DUN multi-connection does not disconnect the concurrently connected HFP, A2DP, and AVRCP and does not interrupt the streaming function based on A2DP and AVRCP.

Figure 5:
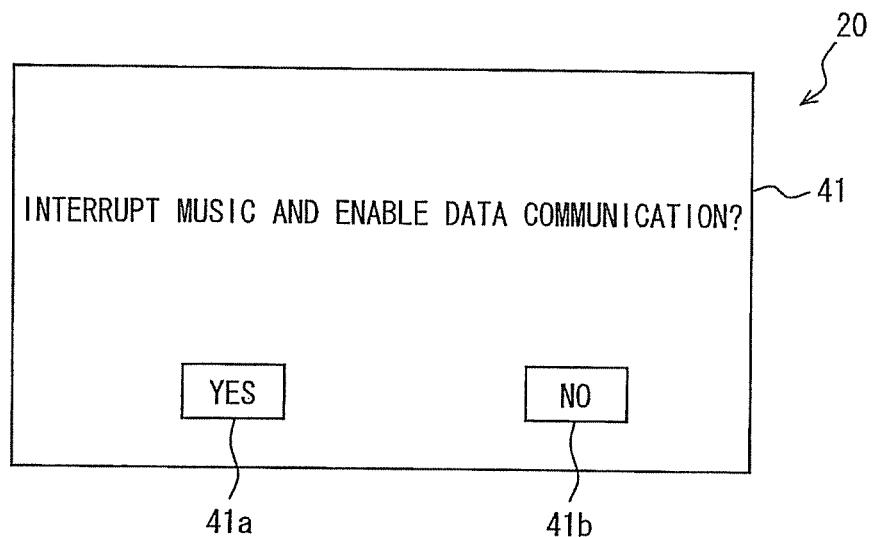
FIG. 5 shows a data communication activation inquiry window.

The controller 4 may determine that the DUN multi-connection succeeds (YES at S3). However, the controller 4 may then determine that the dial-up connection from the phone communication portion 23 to the communication network 33 fails (NO at S5) (i.e., determine that the dial-up connection from the phone communication portion 23 to the communication network 33 accompanying the DUN multi-connection results in a failure). In this case, the controller 4 outputs a display instruction signal to the display controller 9. As shown in FIG. 5, the controller 4 allows the display unit 20 to display a data communication activation inquiry window 41 (S6). For example, the data communication activation inquiry window 41 contains such message as "are you sure to interrupt music and enable data communication?" This inquires a user whether to interrupt the streaming function in process and enable the data communication based on DUN. The dial-up connection from the phone communication portion 23 to the communication network 33 fails possibly because HFP, A2DP, and AVRCP are concurrently connected or the streaming function is in progress based on A2DP and AVRCP.

The data communication activation inquiry window 41 includes a "YES" switch 41a and a "NO" switch 41b. The user can operate the "YES" switch 41a to interrupt the streaming function in process and enable the data communication based on DUN. The user can operate the "NO" switch 41b to uninterruptedly perform the streaming function in process and disable the data communication based on DUN.

The controller 4 may determine that the operation detection signal is supplied from the operation input portion 10 and the user operates the "YES" switch 41a. The controller 4 may thereby determine that the user interrupts the streaming function in process and enables the DUN data communication (YES at S7). The controller 4 allows the BT module 5 to transmit a streaming function interrupt request signal (data communication interrupt request signal) to the BT module 24 so as to interrupt the streaming function based on A2DP and AVRCP (S8). The controller 4 allows the phone communication portion 23 to make dial-up connection to the communication network 33 while HFP, A2DP, and AVRCP are concurrently connected and the streaming function based on A2DP and AVRCP is interrupted (S9). The controller 4 determines whether the dial-up connection from the phone communication portion 23 to the communication network 33 succeeds (S10).

The controller 4 may determine that the dial-up connection from the phone communication portion 23 to the communication network 33 succeeds (YES at S10). The controller 4 then allows the BT module 5 to transmit a streaming function restart request signal (data communication restart request signal) to the BT module 24. The controller 4 restarts the interrupted streaming function based on A2DP and AVRCP (S11). The controller 4 then terminates the profile connection request determination process and returns to the main process.

As shown in FIG. 8, the DUN multi-connection may be successful but the dial-up connection may be unsuccessful. In this case, the controller 4 interrupts the streaming function based on A2DP and AVRCP without disconnecting any of HFP, A2DP, and AVRCP concurrently connected when a DUN multi-connection request occurs. The controller 4 restarts the interrupted streaming function based on A2DP and AVRCP after successful dial-up connection from the phone communication portion 23 to the communication network 33. The controller 4 then transitions to concurrent connection of HFP, A2DP, AVRCP, and DUN.

The controller 4 may determine that the dial-up connection from the phone communication portion 23 to the communication network 33 fails (NO at S10). The controller 4 then allows the BT module 5 to transmit a DUN disconnection request signal to the BT module 24 so as to disconnect DUN between the BT modules 5 and 24 (S12). The controller 4 allows the BT module 5 to transmit an A2DP/AVRCP disconnection request signal to the BT module 24 so as to disconnect A2DP and AVRCP between the BT modules 5 and 24 (S13). The controller 4 performs the DUN multi-connection while A2DP and AVRCP are disconnected and only HFP is connected (S14). The controller 4 determines whether the DUN multi-connection succeeds (S15).

The controller 4 may determine that the DUN multi-connection succeeds (YES at S15). The controller 4 allows the BT module 5 to transmit an A2DP/AVRCP connection request signal to the BT module 24 so as to reconnect the disconnected A2DP and AVRCP between the BT modules 5 and 24 (S16).

The controller 4 performs the dial-up connection from the phone communication portion 23 to the communication network 33 while HFP, A2DP, and AVRCP are concurrently connected (S17). The controller 4 then determines whether the dial-up connection from the phone communication portion 23 to the communication network 33 succeeds (S18).

The controller 4 may determine that the dial-up connection from the phone communication portion 23 to the communication network 33 succeeds (YES at S18). The controller 4 then allows the BT module 5 to transmit a streaming function restart request signal to the BT module 24 so as to restart the interrupted streaming function based on A2DP and AVRCP (S19). The streaming function was interrupted because A2DP and AVRCP were disconnected. The controller 4 then terminates the profile connection request determination process and returns to the main process.

As shown in FIG. 9, the controller 4 interrupts the streaming function based on A2DP and AVRCP. If the dial-up connection fails, the controller 4 disconnects DUN, A2DP, and AVRCP. The controller 4 reconnects the disconnected A2DP and AVRCP after the DUN multi-connection succeeds. The controller 4 restarts the interrupted streaming function based on A2DP and AVRCP after the dial-up connection from the phone communication portion 23 to the communication network 33 succeeds. The streaming function was interrupted because A2DP and AVRCP were disconnected. The controller 4 then transitions to concurrent connection of HFP, A2DP, AVRCP, and DUN.

On the other hand, the controller 4 may determine that the dial-up connection from phone communication portion 23 to the communication network 33 fails (NO at S13). The controller 4 then allows the BT module 5 to transmit the A2DP/AVRCP disconnection request signal to the BT module 24 so as to disconnect A2DP and AVRCP between the BT modules 5 and 24 (S20). The controller 4 performs the dial-up connection from the phone communication portion 23 to the communication network 33 while A2DP and AVRCP are disconnected (S21). The controller 4 then determines whether the dial-up connection from the phone communication portion 23 to the communication network 33 succeeds (S22).

The controller 4 may determine that the dial-up connection from the phone communication portion 23 to the communication network 33 succeeds (YES at S22). The controller 4 then allows the BT module 5 to transmit the A2DP/AVRCP connection request signal to the BT module 24 so as to reconnect the disconnected A2DP and AVRCP between the BT modules 5 and 24 (S23). The controller 4 allows the BT module 5 to transmit the streaming function restart request signal to the BT module 24 so as to restart the interrupted streaming function based on A2DP and AVRCP (S24). The streaming function was interrupted because A2DP and AVRCP were disconnected. The controller 4 then terminates the profile connection request determination process and returns to the main process.

As shown in FIGS. 10 and 11, the controller 4 connects A2DP and AVRCP but may fail in the dial-up connection from the phone communication portion 23 to the communication network 33. The controller 4 then disconnects the connected A2DP and AVRCP and may succeed in the dial-up connection from the phone communication portion 23 to the communication network 33. The controller 4 then reconnects the disconnected A2DP and AVRCP. The controller 4 restarts the interrupted streaming function based on A2DP and AVRCP. The streaming function was interrupted because A2DP and AVRCP were disconnected. The controller 4 then transitions to concurrent connection of HFP, A2DP, AVRCP, and DUN.

The controller 4 may determine that the dial-up connection from the phone communication portion 23 to the communication network 33 fails (NO at S22). The controller 4 then allows the BT module 5 to transmit the DUN disconnection request signal to the BT module 24 so as to disconnect DUN between the BT modules 5 and 24 (S25). The controller 4 allows the BT module 5 to transmit an HFP disconnection request signal to the BT module 24 so as to disconnect HFP between the BT modules 5 and 24. The controller 4 allows the BT module 5 to transmit the A2DP/AVRCP disconnection request signal to the BT module 24 so as to disconnect A2DP and AVRCP between the BT modules 5 and 24 (S26).

The controller 4 allows the BT module 5 to transmit a DUN connection request signal to the BT module 24 so as to connect DUN between the BT modules 5 and 24 (S27). The controller 4 allows the BT module 5 to transmit an HFP connection request signal to the BT module 24 so as to connect HFP between the BT modules 5 and 24. The controller 4 allows the BT module 5 to transmit the A2DP/AVRCP connection request signal to the BT module 24 so as to connect A2DP and AVRCP between the BT modules 5 and 24 (S28). The controller 4 performs the dial-up connection from the phone communication portion 23 to the communication network 33 (S29). The controller 4 determines whether the dial-up connection from the phone communication portion 23 to the communication network 33 succeeds (S30).

The controller 4 may determine that the dial-up connection from the phone communication portion 23 to the communication network 33 succeeds (YES at S30). The controller 4 then allows the BT module 5 to transmit the streaming function restart request signal to the BT module 24 so as to restart the interrupted streaming function based on A2DP and AVRCP (S31). The streaming function was interrupted because A2DP and AVRCP were disconnected. The controller 4 then terminates the profile connection request determination process and returns to the main process.

As shown in FIG. 12, the controller 4 disconnects A2DP and AVRCP but may fail in the dial-up connection. The controller 4 disconnects DUN. The controller 4 disconnects HFP, A2DP, and AVRCP. The controller 4 connects DUN. The controller 4 connects HFP, A2DP, and AVRCP. The controller 4 succeeds in the dial-up connection from the phone communication portion 23 to the communication network 33. The controller 4 then restarts the interrupted streaming function based on A2DP and AVRCP. The streaming function was interrupted because A2DP and AVRCP were disconnected. The controller 4 transitions to concurrent connection of HFP, A2DP, AVRCP, and DUN.

The controller 4 may determine that the dial-up connection from the phone communication portion 23 to the communication network 33 fails (NO at S30). The controller 4 then allows the BT module 5 to transmit the HFP disconnection request signal to the BT module 24 so as to disconnect HFP between the BT modules 5 and 24. The controller 4 then allows the BT module 5 to transmit the A2DP/AVRCP disconnection request signal to the BT module 24 so as to disconnect A2DP and AVRCP between the BT modules 5 and 24 (S32). The controller 4 performs the dial-up connection from the phone communication portion 23 to the communication network 33 (S33). The controller 4 determines whether the dial-up connection from the phone communication portion 23 to the communication network 33 succeeds (S34).

The controller 4 may determine that the dial-up connection from the phone communication portion 23 to the communication network 33 succeeds (YES at S34). The controller 4 then allows the BT module 5 to transmit the HFP connection request signal to the BT module 24 so as to connect HFP between BT modules 5 and 24. The controller 4 allows the BT module 5 to transmit the A2DP/AVRCP connection request signal to the BT module 24 so as to connect A2DP and AVRCP between the BT modules 5 and 24 (S35). The controller 4 allows the BT module 5 to transmit the streaming function restart request signal to the BT module 24 so as to restart the interrupted streaming function based on A2DP and AVRCP (S36). The streaming function was interrupted because A2DP and AVRCP were disconnected. The controller 4 then terminates the profile connection request determination process and returns to the main process.

Figure 13:
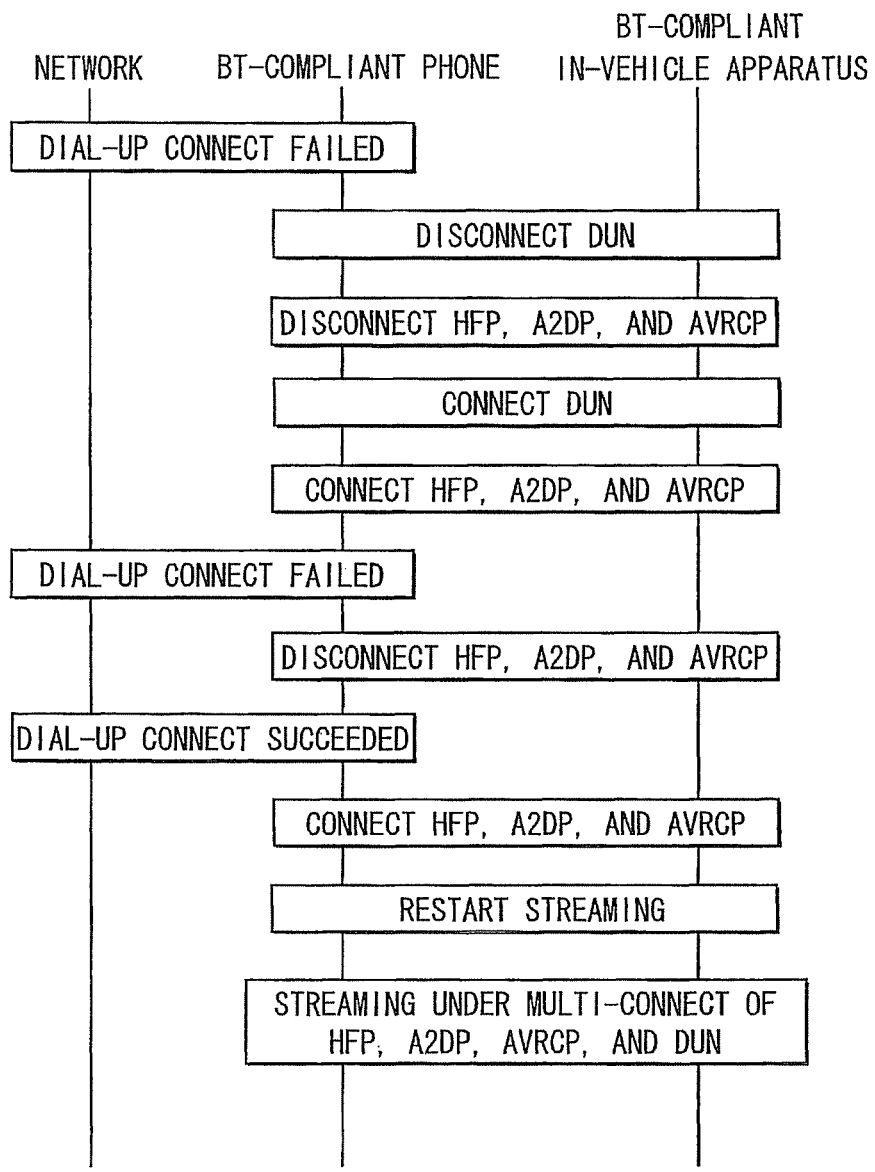

As shown in FIG. 13, the controller 4 connects HFP, A2DP, and AVRCP but may fail in the dial-up connection from the phone communication portion 23 to the communication network 33. The controller 4 disconnects the connected HFP, A2DP, and AVRCP. The controller 4 succeeds in the dial-up connection from the phone communication portion 23 to the communication network 33. The controller 4 connects the disconnected HFP, A2DP, and AVRCP. The controller 4 then restarts the interrupted streaming function based on A2DP and AVRCP. The streaming function was interrupted because A2DP and AVRCP were disconnected. The controller 4 transitions to concurrent connection of HFP, A2DP, AVRCP, and DUN.

Figure 6:
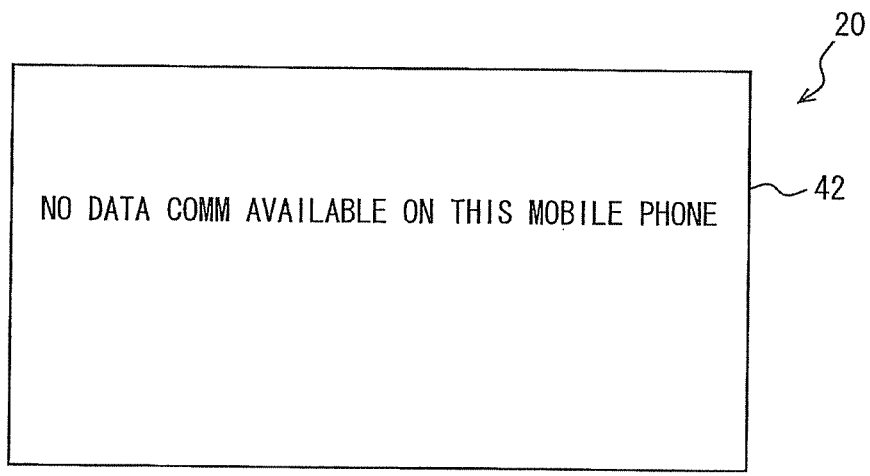
FIG. 6 shows an unavailable data communication notification window.

On the other hand, the controller 4 may determine that the dial-up connection from the phone communication portion 23 to the communication network 33 fails (NO at S34). The controller 4 then outputs the display instruction signal to the display controller 9. As shown in FIG. 6, the controller 4 allows the display unit 20 to display an unavailable data communication notification window 42 (S37). For example, the unavailable data communication notification window 42 contains such message as "no data communication available on this mobile phone." This notifies a user that no data communication is available on the mobile phone 3 being connected to the BT communication link. The controller 4 then terminates the profile connection request determination process and returns to the main process.

The controller 4 may determine that the DUN multi-connection was performed immediately after an occurrence of the DUN multi-connection request but failed (NO at S3). Also in this case, the controller 4 outputs the display instruction signal to the display controller 9. As shown in FIG. 5, the controller 4 allows the display unit 20 to display the data communication activation inquiry window 41 (S38). For example, the data communication activation inquiry window 41 contains such message as "are you sure to interrupt music and enable data communication?" This inquires the user whether to interrupt the streaming function in process and enable the data communication based on DUN.

The controller 4 may determine that the operation detection signal is supplied from the operation input portion 10 and the user operates the "YES" switch 41a. The controller 4 may thereby determine that the user interrupts the streaming function in process and enables the DUN data communication (YES at S39). The controller 4 then performs the process at S13 and later, as described above.

The controller 4 may determine that the DUN multi-connection was performed with A2DP and AVRCP disconnected but failed (NO at S15). The controller 4 then allows the BT module 5 to transmit the HFP disconnection request signal to the BT module 24 so as to disconnect HFP between the BT modules 5 and 24 (S40). The controller 4 then performs the process at S27 and later described above.

As described above, a DUN multi-connection request may occur while HFP, A2DP, and AVRCP are connected between the BT modules 5 and 24 and the streaming function based on A2DP and AVRCP is in progress from BT module 24 to the BT module 5. In such a case, the controller 4 performs the DUN multi-connection and the dial-up connection. The DUN multi-connection request may be rejected and the DUN multi-connection or the dial-up connection may fail. In such a case, the controller 4 disconnects or connects the concurrently connected HFP, A2DP, and AVRCP. The controller 4 also interrupts or restarts the streaming function based on A2DP and AVRCP. The purpose is to permit the DUN multi-connection request (after the cause of the rejection is solved) and succeed in the DUN multi-connection and the dial-up connection.

There has been described a case where the DUN multi-connection request occurs while HFP, A2DP, and AVRCP are concurrently connected and the streaming function is in process based on A2DP and AVRCP. The same applies to a case where a multi-connection request for another profile occurs while the other profiles are concurrently connected or data communication is in process based on the other profiles. According to the above-mentioned description, the concurrently connected HFP, A2DP, and AVRCP are disconnected in the order of A2DP and AVRCP and then HFP. Accordingly, the connection of HFP precedes that of A2DP and AVRCP. This can keep the connection of HFP as long as possible and activate the hands-free function as long as possible. By contrast, HFP, A2DP, and AVRCP are disconnected in the order of HFP and then A2DP and AVRCP. Accordingly, the connection of A2DP and AVRCP precedes that of HFP. This can keep connection of A2DP and AVRCP as long as possible and activate the streaming function as long as possible. For example, HFP, A2DP, and AVRCP may be concurrently disconnected immediately after the first determination of unsuccessful dial-up connection.

There has been described a case of interrupting and restarting the streaming function based on A2DP and AVRCP. For example, there may be a case where the streaming function based on A2DP and AVRCP is performed concurrently with the phone book data transfer based on PBAP. In such a case, it may be possible to interrupt and restart the streaming function based on A2DP and AVRCP as well as the phone book data transfer based on PBAP. It is possible to interrupt the streaming function based on A2DP and AVRCP, and then the phone book data transfer based on PBAP. In this case, the phone book data transfer based on PBAP can precede the streaming function based on A2DP and AVRCP. By contrast, it is possible to interrupt the phone book data transfer based on PBAP, and then the streaming function based on A2DP and AVRCP. In this case, the streaming function based on A2DP and AVRCP can precede the phone book data transfer based on PBAP. Further, it may be possible to interrupt the streaming function based on A2DP and AVRCP and the phone book data transfer based on PBAP at the same time.

HFP, A2DP, and AVRCP may be concurrently connected between the BT modules 5 and 24. In addition, the streaming function based on A2DP and AVRCP may be performed from the BT module 24 to the BT module 5. In this situation, a DUN multi-connection request may occur. Then, the concurrently connected HFP, A2DP, and AVRCP may be disconnected without performing the DUN multi-connection. Alternatively, the active streaming function based on A2DP and AVRCP may be interrupted. After that, the DUN connection may be performed.

There may be a procedure corresponding to the successful DUN multi-connection and the successful dial-up connection. It may be possible to store the procedure in association with identification information (e.g., a unit number) about the mobile phone 3 being connected to the BT communication link. A similar situation may occur subsequently. That is, the same mobile phone 3 may connect to the BT communication link. HFP, A2DP, and AVRCP may be concurrently connected between the BT modules 5 and 24. The streaming function based on A2DP and AVRCP may be performed from the BT module 24 to the BT module 5. If a DUN multi-connection request occurs, HFP, A2DP, and AVRCP may be connected or disconnected or the streaming function based on A2DP and AVRCP may be interrupted or restarted in accordance with the stored procedure.

According to the above-mentioned description, a specific combination of profiles is disconnected and disconnected. A specific combination of data communications based on the profiles is interrupted and restarted. In addition, only one of profiles may be disconnected and connected. Only one of data communications based on the profiles may be interrupted and restarted.

According to the embodiment as described above, the in-vehicle apparatus 2 is concurrently connecting HFP, A2DP, and AVRCP and is performing the streaming function based on A2DP and AVRCP. In this situation, a DUN connection request may occur and may be rejected to disallow the connection. The in-vehicle apparatus 2 then disconnects the concurrently connected HFP, A2DP, and AVRCP or interrupts the streaming function based on A2DP and AVRCP to remove a cause of rejecting the DUN connection request. The in-vehicle apparatus 2 can connect DUN with the mobile phone 3 because the cause of rejecting the DUN connection request is removed.

The disclosure is not limited to the above-mentioned embodiment but can be modified or enhanced as follows. The short range wireless communication apparatus is not limited to the in-vehicle apparatus 2. The short range wireless communication apparatus just needs to include a BT module that functions equivalently to the BT module 5. The short range wireless communication apparatus may be equivalent to a navigation system having known navigation functions. The short range wireless communication apparatus may not be mounted on vehicles. The communication-party apparatus as a data communication party for the short range wireless communication apparatus is not limited to the mobile phone 3. The communication-party apparatus just needs to include a BT module that functions equivalently to the BT module 24. The communication-party apparatus may be equivalent to a mobile information terminal or a stationary terminal unsuitable to carry.

There has been described the visual method that displays the data communication activation inquiry window 41 so as to inquire of a user whether to interrupt the active streaming function and perform the data communication based on DUN. The method is not limited thereto and may be audible so as to output the audio guidance notifying the necessary information. In addition, the method may be visual and audible. Similarly, there has been described the visual method that displays the unavailable data communication notification window 42 so as to notify a user of no data communication available on the mobile phone 3 connected to the BT communication link. The method is not limited thereto and may be audible so as to output the audio guidance notifying the necessary information. In addition, the method may be visual and audible.

It may be possible to notify the user that the profile is disconnected or connected each time the corresponding event occurs. It may be possible to notify the user that the profile-based data communication is interrupted or restarted each time the corresponding event occurs. As a result, the user can be notified of the profile state (whether disconnected or not) or the profile-based data communication state (whether interrupted or not).

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A short range wireless communication apparatus comprising:
   a connection device that is capable of concurrently connecting a plurality of communication protocols with a communication-party connection device through a short range wireless communication link; and
   a control device that controls connection and disconnection of each of the plurality of communication protocols,
   wherein:
   when a connection request for a different communication protocol occurs under a state where multiple communication protocols of the plurality of communication protocols are concurrently connected between the connection device and the communication-party connection device, the different communication protocol being included in the plurality of communication protocols but not included in the multiple communication protocols,
   the control device performs a connection of the different communication protocol between the connection device and the communication-party connection device; and
   when it is determined that the connection of the different communication protocol between the connection device and the communication-party connection device resulted in a failure,
   the control device
      selects as a disconnection target at least one of the multiple communication protocols being concurrently connected,
      performs a disconnection of the disconnection target, and
      performs a re-connection of the different communication protocol, the connection of which resulted in the failure, between the connection device and the communication-party connection device.

2. The short range wireless communication apparatus according to claim 1, wherein:
   each time it is determined that the connection of the different communication protocol between the connection device and the communication-party connection device resulted in the failure,
   the control device selects, as the disconnection target, at least one of the multiple communication protocols concurrently connected in accordance with a predetermined order and performs the disconnection of the disconnection target.

3. The short range wireless communication apparatus according to claim 1, wherein:
   each time it is determined that the connection of the different communication protocol between the connection device and the communication-party connection device resulted in the failure,
   the control device selects, as the disconnection target, all of the multiple communication protocols concurrently connected and performs the disconnection of the disconnection target.

4. The short range wireless communication apparatus according to claim 1, wherein:
   when it is determined that the re-connection of the different communication protocol between the connection device and the communication-party connection device resulted in a success,
   the control device performs a connection of the disconnection target, the disconnection of which was performed, between the connection device and the communication-party connection device.

5. The short range wireless communication apparatus according to claim 1, wherein:
when it is determined that the re-connection of the different communication protocol between the connection device and the communication-party connection device resulted in a success,
the control device stores, as a stored successful disconnection target, the disconnection target, the disconnection of which enabled the re-connection of the different communication protocol to have resulted in the success; and
when, after storing the stored successful disconnection target, another connection request for the different communication protocol occurs under a state where multiple communication protocols of the plurality of communication protocols are concurrently connected between the connection device and the communication-party connection device,
the control device
selects the stored successful disconnection target as the disconnection target of the at least one of the multiple communication protocols being concurrently connected, and
performs, as the disconnection of the disconnection target, a disconnection of the stored successful disconnection target between the connection device and the communication-party connection device.

6. The short range wireless communication apparatus according to claim 5, wherein:
after performing, as the disconnection of the disconnection target, the disconnection of the stored successful disconnection target between the connection device and the communication-party connection device,
the control device performs a connection of the different communication protocol between the connection device and the communication-party connection device.

7. The short range wireless communication apparatus according to claim 1, wherein:
the short range wireless communication link includes a Bluetooth communication link;
the different communication protocol includes a dial-up networking profile; and
the control device is enabled to perform a connection of the dial-up networking profile between the connection device and the communication-party connection device through the Bluetooth communication link.

8. A short range wireless communication apparatus comprising:
a connection device that is capable of concurrently connecting a plurality of communication protocols with a communication-party connection device through a short range wireless communication link; and
a control device that controls connection and disconnection of each of the plurality of communication protocols, wherein:
when a connection request for the different communication protocol occurs under a state where multiple communication protocols of the plurality of communication protocols are concurrently connected between the connection device and the communication-party connection device, the different communication protocol being included in the plurality of communication protocols but not included in the multiple communication protocols,
the control device performs a connection of the different communication protocol between the connection device and the communication-party connection device; and
when it is determined that a connection to an outside communication network resulted in a failure, the connection to the outside communication network accompanying the connection of the different communication protocol between the connection device and the communication-party connection device,
the control device
selects as a disconnection target at least one of the multiple communication protocols being concurrently connected,
performs a disconnection of the disconnection target, and
performs a re-connection of the different communication protocol between the connection device and the communication-party connection device.

9. The short range wireless communication apparatus according to claim 8, wherein:
each time it is determined that the connection to the outside communication network between the connection device and the communication-party connection device resulted in the failure,
the control device selects, as the disconnection target, at least one of the multiple communication protocols concurrently connected in accordance with a predetermined order and performs the disconnection of the disconnection target.

10. The short range wireless communication apparatus according to claim 8, wherein:
each time it is determined that the connection to the outside communication network resulted in the failure,
the control device selects, as the disconnection target, all of the multiple communication protocols concurrently connected and performs the disconnection of the disconnection target between the connection device and the communication-party connection device.

11. The short range wireless communication apparatus according to claim 8, wherein:
the short range wireless communication link includes a Bluetooth communication link;
the different communication protocol includes a dial-up networking profile; and
the control device is enabled to perform a connection of the dial-up networking profile between the connection device and the communication-party connection device through the Bluetooth communication link.

12. A short range wireless communication apparatus comprising:
a connection device that is capable of concurrently connecting a plurality of communication protocols with a communication-party connection device through a short range wireless communication link; and
a control device that controls interrupt and re-connection of a data communication using each of the plurality of communication protocols,
wherein:
when a connection request for the different communication protocol occurs under a state where multiple data communications using multiple communication protocols of the plurality of communication protocols are performed between the connection device and the communication-party connection device, the different communication protocol being included in the plurality of communication protocols but not included in the multiple communication protocols,
the control device performs a connection of the different communication protocol between the connection device and the communication-party connection device; and when it is determined that the connection of the different communication protocol between the connection device and the communication-party connection device resulted in a failure, the control device selects as an interrupt target at least one of the multiple data communications being performed between the connection device and the communication-party connection device, performs an interrupt of the interrupt target, and performs a re-connection of the different communication protocol, the connection of which resulted in the failure, between the connection device and the communication-party connection device.

13. The short range wireless communication apparatus according to claim 12, wherein:

each time it is determined that the connection of the different communication protocol between the connection device and the communication-party connection device resulted in the failure, the control device selects, as the interrupt target, at least one of the multiple data communications being performed between the connection device and the communication-party connection device in accordance with a predetermined order and performs the interrupt of the interrupt target.

14. The short range wireless communication apparatus according to claim 12, wherein:

each time it is determined that the connection of the different communication protocol between the connection device and the communication-party connection device resulted in the failure, the control device selects, as the interrupt target, all of the multiple data communications being performed between the connection device and the communication-party connection device and performs the interrupt of the interrupt target.

15. The short range wireless communication apparatus according to claim 12, wherein:

when it is determined that the re-connection of the different communication protocol between the connection device and the communication-party connection device resulted in a success, the control device performs a connection of the interrupt target, the interrupt of which was performed, between the connection device and the communication-party connection device.

16. The short range wireless communication apparatus according to claim 12, wherein:

when it is determined that the re-connection of the different communication protocol between the connection device and the communication-party connection device resulted in a success, the control device stores, as a stored successful interrupt target, the interrupt target, the interrupt of which enabled the re-connection of the different communication protocol to have resulted in the success; and when, after storing the stored successful disconnection target, another connection request for the different communication protocol occurs under a state where multiple communication protocols of the plurality of communication protocols are concurrently connected between the connection device and the communication-party connection device, the control device selects the stored successful interrupt target as the interrupt target of the at least one of the multiple data communications being performed between the connection device and the communication-party connection device, and performs, as the interrupt of the interrupt target, an interrupt of the stored successful interrupt target between the connection device and the communication-party connection device.

17. The short range wireless communication apparatus according to claim 16, wherein:

after performing, as the interrupt of the interrupt target, the interrupt of the stored successful interrupt target between the connection device and the communication-party connection device, the control device performs a connection of the different communication protocol between the connection device and the communication-party connection device.

18. The short range wireless communication apparatus according to claim 12, wherein:

the short range wireless communication link includes a Bluetooth communication link;

the different communication protocol includes a dial-up networking profile; and the control device is enabled to perform a connection of the dial-up networking profile between the connection device and the communication-party connection device through the Bluetooth communication link.

19. A short range wireless communication apparatus comprising:

a connection device that is capable of concurrently connecting a plurality of communication protocols with a communication-party connection device through a short range wireless communication link; and a control device that controls connection and disconnection of each of the plurality of communication protocols, wherein:

when a connection request for a different communication protocol occurs under a state where multiple communication protocols of the plurality of communication protocols are concurrently connected between the connection device and the communication-party connection device, the different communication protocol being included in the plurality of communication protocols but not included in the multiple communication protocols, the control device selects as a disconnection target at least one of the multiple communication protocols being concurrently connected, performs a disconnection of the disconnection target, and performs thereafter a connection of the different communication protocol between the connection device and the communication-party connection device.

20. The short range wireless communication apparatus according to claim 19, wherein:

the short range wireless communication link includes a Bluetooth communication link;

the different communication protocol includes a dial-up networking profile; and the control device is enabled to perform a connection of the dial-up networking profile between the connection device and the communication-party connection device through the Bluetooth communication link.

* * * * *